Oct. 31, 1939.   J. C. DEITZ   2,177,870
BODY AND ENGINE TEMPERATURE CONTROL SYSTEM FOR MOTOR VEHICLES
Filed Feb. 24, 1936
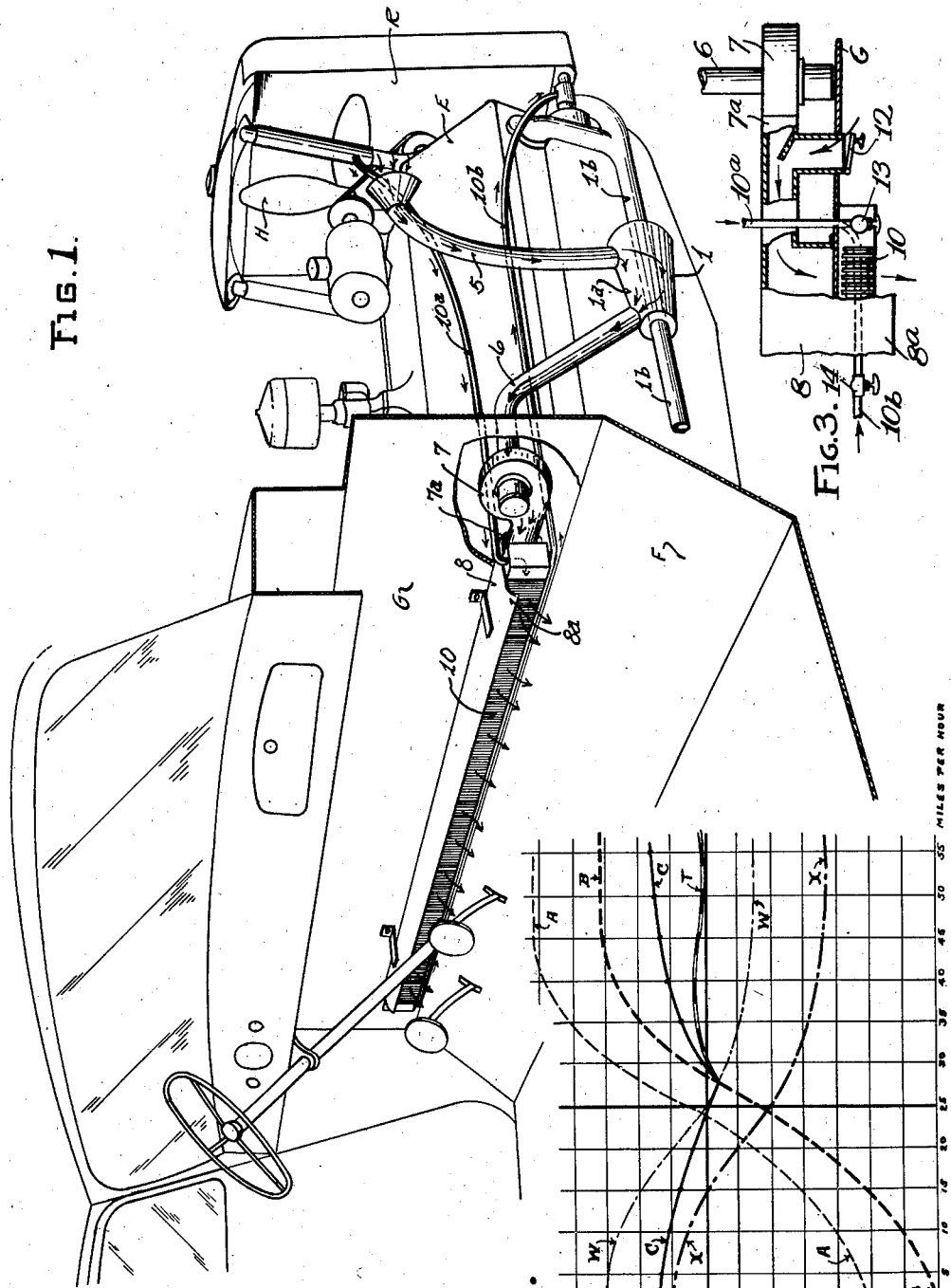

Patented Oct. 31, 1939

2,177,870

UNITED STATES PATENT OFFICE 2,177,870

BODY AND ENGINE TEMPERATURE CONTROL SYSTEM FOR MOTOR VEHICLES

John C. Deitz, St. Clair Shores, Mich.

Application February 24, 1936, Serial No. 65,378

3 Claims. (Cl. 237—12.3)

This invention relates to motor vehicles and particularly to an improved vehicle body heating and engine temperature control system by which more uniform and efficient heating of the interior of the body is provided and the engine is automatically maintained at a proper temperature for efficient operation.

One of the principal objects of the present invention is to operatively relate the cooling media of the engine and the heat provided by the discharged exhaust products from the engine in a manner such that both contribute heat to the body when the engine is operating at proper temperature and the heat of the exhaust products is added automatically to the cooling media of the engine as the engine temperature drops below a predetermined degree.

Another object is to heat the air supplied into the body both by heat from the engine exhaust products and from the engine cooling media preparatory to the general diffusion of the air throughout the interior of the body.

Another object is to heat the body by an air swept exhaust heat exchanger and to modulate the heat of the air by absorbing part of such heat in the engine cooling media when the temperature of the cooling media is below that required for efficient engine operation and by augmenting, automatically, such heat by adding heat from the engine cooling media when the engine is working at proper operating temperature.

A more specific object is to heat the air introduced into the body by an exhaust heat exchanger initially and to pass the heat therefrom into intimate heating relation to a water heat exchanger connected with the water cooling system of the engine prior to the general diffusion of the air throughout the body.

Another specific object is to modulate the heat exchanging effect of one exchanger by the other by maintaining the exchangers in intimate heat exchanging relation with each other.

Other objects and advantages will become apparent from the following specification wherein reference is made to the drawing in which:

Fig. 1 is a perspective view of a system embodying the principles of the present invention showing the same installed in a motor vehicle;

Fig. 2 is a graphical illustration of the combined effect of the heat exchangers of the present system; and Fig. 3 is a fragmentary plan view with parts removed showing certain details of the invention.

For purposes of illustration, the present invention is shown in connection with a small passenger vehicle, its use in connection with larger commercial passenger coaches being readily apparent therefrom.

It should be noted, however, that in connection with city passenger transportation coaches and the like, the coaches often operate at widely varying speeds and stop frequently for short intervals to take on and discharge passengers. The present system is particularly useful under such operating conditions in that it takes advantage of the large amount of heat supplied by the water system of the engine at slow or idling speeds and the large amount of heat supplied by the exhaust products at higher running speeds, thus utilizing both available sources of heat to advantage. In vehicles of this character, the common practice has been to heat the vehicle body either by a water heat exchanger connected with the engine cooling system or by an exhaust heater.

Exhaust heaters are very effective when the engine is operating at a moderate or high speed, and especially when under heavy load. Water heaters, on the contrary, are effective when the engine is idling or the vehicle moving at low speed. At higher speeds, the much greater volume of air passing through the outside radiator of the engine greatly reduces the temperature of the cooling media, often chilling the engine below efficient operating temperatures, and also rendering the cooling media ineffective for heating the interior of the coach body. If the radiator is covered, so as to reduce the passage of cooling air therethrough, there is great danger of overheating of the engine when it is idling.

Many city transportation coaches do not use anti-freeze mixtures in cold weather, due to the fact that the short stops and slower speeds do not require such, as so little heat is radiated from the main radiator that the engines are maintained at non-freezing temperatures. If, however, this cooling media is passed through a radiator within the body, and a large volume of outside air blown thereover, freezing of the water cooling system results. Even though freezing may not result in all instances, the temperature of the engine is so lowered that efficient operation is impossible. All of these objectionable features are overcome by the structure herein described and automatic modulation of the heat discharged into the body and the temperature of the engine is maintained entirely by the thermal interchange between the heat exchangers related as herein described.

Referring to Fig. 1 the apparatus is shown installed in a motor vehicle of which only the engine, main radiator, and front portion of the body are illustrated. The vehicle has an internal combustion engine, indicated diagrammatically at E, and conventional outside radiator R connected to the water cooling system of the engine block. The vehicle has a floor F and the usual front panel G which enclose the forward portion of the body. Adjacent the engine E is mounted an exhaust heat exchanger, designated generally as 1, which comprises an air tight housing 1a through which extends the exhaust pipe 1b of the engine, the exhaust pipe leading to the usual muffler, not shown. The exhaust pipe 1b is sealed from communication with the interior of the housing 1a to prevent entry and seepage of gases from the exhaust pipe thereinto.

An air supply duct 5 leads into the housing 1a of the exchanger 1 for supplying air therethrough into heat exchanging relation to the heated exhaust pipe 1b, the air being forced through the duct 5 due to the forward motion of the vehicle and the usual fan H of the engine. At the end of the casing 1a, opposite its point of connection to the duct 5, is a discharge duct 6 which leads to the inlet of a motor driven blower 7. The blower 7, in turn, discharges into the interior of a header or conduit 8 which is preferably located within the body directly against the front wall G. Thus the flow of air into and through the exchanger 1 is further assisted by the blower 7.

The discharge nozzle 7a of the blower 7 is preferably slightly smaller in cross section than the cross section of the conduit 8 so as to induce air into the conduit 8 and thus provide for the passage of a larger volume of air through the conduit 8 than is supplied from the heat exchanger 1 without any additional burden on the blower. If desired, a suitable duct may be provided so that air from within the body is induced around the nozzle 7a, thus recirculating part of the warm inside air. The conduit 8 has a top wall 8a which is curved downwardly slightly so as to deflect air coming out of the front of the conduit downwardly toward the floor of the vehicle. It is desirable that the air discharged from the conduit 8 be distributed uniformly along the front of the vehicle so that neither the driver nor the passengers will be subjected to heavy localized currents of hot or cold air. In order to provide for effective and uniform distribution of the air from the conduit 8, the front of the conduit is defined by the water heat exchanger itself.

The water heat exchanger 10 is preferably of a construction similar to the usual outside radiator R, except that it is elongated and extends substantially the full length of the conduit 8. The fins and water tubes of the water heat exchanger 10 necessarily baffle the air passing out of the conduit 8 to such an extent that slight pressure is built up in the conduit and the resultant discharge of air through the exchanger 10 is substantially uniformly distributed along its length. The heat exchanger 10 is connected into the water cooling system of the engine at convenient points of connection. In the form illustrated, this connection is effected through an inlet conduit 10a connected to the engine water cooling system on the pressure side of the pump thereof and a conduit 10b connected to the water cooling system on the suction side of the pump so that a differential in water pressure is obtained for effecting circulation of the water of the engine through the exchanger 10.

If desired, a suitable damper 12 may be provided between the discharge nozzle 7a of the blower and inlet of the conduit 8 so that the amount of induced air may be controlled and suitable valves 13 and 14 may be provided in the conduit lines 10a and 10b respectively for controlling the flow of the engine cooling media through the heat exchanger 10. Thus either fresh air, or fresh air and partially re-circulated air, may be passed through the heat exchanger 10 preparatory to general diffusion of the air throughout the body.

In operation, fresh outside air taken from the front of the vehicle is passed through the exchanger 1 and therein heated to a certain degree whereupon it passes through the conduit 6 into the blower 7, both the blower and forward motion of the car forcing the air through the heat exchanger 1. Before diffusion of this air from the blower into the body it necessarily must pass through the heat exchanger 10 which is located directly in the path of discharge.

Here a distinct advantage of an elongated heater should be noted. It is well known that the transfer of heat from water to a given outside medium requires a greater interval of time than is required for the transfer to the same media of heat from a hot metal pipe, such as in the exhaust heater. In the types of water heat exchangers heretofore used, the radiating portion is usually substantially square or slightly rectangular and is comparatively thick fore and aft. In passing air through such an exchanger, all of the air must necessarily pass through a passage of comparatively small cross sectional area with the result that its velocity is relatively high and it does not remain in contact with the exchanger for a sufficient interval of time to permit an efficient transfer of heat from the water.

By providing an elongated exchanger such as herein illustrated, however, a much larger passage for air is provided without any decrease in the water capacity of the exchanger. As a result, if the same amount of air is passed through the elongated exchanger as is passed through the prior types, this air moves at much less velocity. Accordingly, a greater time interval elapses during which the air is in contact with the radiating fins of the exchanger. This time interval permits more efficient exchange of heat between the water and the air.

More specifically, in order to illustrate this effect, let it be assumed that the present heat exchanger 10 is cut to one half its length and the two halves placed one in front of the other in the direction of flow of the air, thus more nearly approximating the prior heaters. Such a construction would necessitate the passage of the air through an opening having half the cross sectional area of the elongated exchanger. This, however, would result in a very great increase in the velocity of the air so that though it passed two sections of the exchanger, it would not be in contact with either for a sufficiently long period to provide an efficient heat exchange.

The greater length of the passage in the direction of flow would retard the flow. Likewise since the air is flowing at greater velocity, the loss of velocity head due to the obstruction of the air by the fore and aft section of the exchanger would be so great as to load the blower disproportionately. In fact, the total interval of exposure of the air to heat radiating surface would be so short that no part of the surface would exchange the amount of heat of which it is capable.

On the other hand, when the exchanger is twice as long transversely of the direction of flow and the same amount of air is passed therethrough, a great advantage is obtained. First, since the flow through the exchanger itself is at much reduced velocity due to the larger cross sectional area of the passage, the head losses are not as great, the same amount of air necessarily passing at half the speed if the passage is twice as large in cross section. This delay also provides a much greater time interval for the air to absorb heat from the exchanger. It might at first appear that the passage of air through fore and aft sections of prior exchangers, though at twice the velocity, would provide as much heat, due to the air being exposed to twice as much total radiating surface. In such a structure, however, all of the air must pass all the obstructing pipes and fins yet not have efficient exchange relation therewith for utilizing the fin and pipes to the extent to which they are capable. With the elongated heat exchanger, however, a longer time of exposure is obtained without as much obstruction to flow and each part of the exchanger operates at much higher efficiency. The total heat obtained from the present exchanger is, therefore, much greater than is obtained from the conventional type.

Usually the amount of air that can be passed efficiently into the vehicle with a given blower is limited by the exhaust heat exchanger and its air capacity wherein the heat exchange is rapid. For economy and efficiency, a small exhaust exchanger with a high velocity stream of air is used. In the water heat exchanger, on the other hand, the exchange is slow, and a large volume of flow of air is necessary for efficient operation but at low velocity. A sufficiently large water heat exchanger for utilizing the safe available portion of the heat content of the engine cooling media, however, can accommodate much more air at low velocity than can be passed through an exhaust exchanger efficiently even at high velocity. In order not to limit the water heat exchanger, therefore, by the amount of air that can be passed through the exhaust exchanger, provision is made for the induction of air between the nozzle 7a and conduit 8. Thus an X volume of air may be passed through the exhaust exchanger and completely utilize all the heat available therein, and a much larger quantity is passed through the water exchanger. Since this additional air is supplied by induction, it does not increase the load on the blower and the power consumption thereof.

The operation of the system is best described in connection with Fig. 2. Referring to Fig. 2, a number of curves are illustrated, these curves being plotted on coordinates in which the abscissa represents speed of the vehicle in miles per hour and the ordinate represents the temperature in degrees Fahrenheit. It is assumed that not only the engine is operating at the proper speed for driving the vehicle at the designated miles per hour but that the motor coach is actually traveling at the speed represented, as the movement of the coach makes a considerable difference in the amount of air passed through the radiator R of the engine and loading of the engine changes materially the volume and temperature of the exhaust products. It is assumed also that the outside temperature conditions are such that a temperature of about zero exists.

Referring to the curves in order, the curve W represents the heat available from the water exchanger, assuming that the air may be passed therethrough very slowly so as to be heated to about the temperature of the water therein. The curve A represents the useful temperature of the exhaust heat exchanger, taking into consideration the necessity for a reasonable volume of air, the distance of the exchanger from the engine, outside radiation losses, and size of heat exchanger which may be accommodated in the space available on the vehicle.

The amount of air supplied to the vehicle body, however, is dependent upon the number of passengers, as state statutes require a minimum volume of fresh outside air per passenger, based on full seating capacity. This amount of outside air is therefore fixed for a given vehicle. If all the air required were passed through only one of the exchangers, sufficient heat would not be available under the severe outside conditions. Furthermore, it must be remembered that the passage of the air through the exchangers in the volume required does not permit the air to become heated to the temperature of the particular exchanger, the ratio of temperature of heated air to useful temperature of the exchanger always being less than unity. This lag in air temperature is determinable and in the present installation is about 20°, both as to the exhaust exchanger and the water exchanger.

Referring again to the curves, the temperature of the air which normally has passed through the water exchanger when the whole volume of air to be supplied is passed therethrough, is indicated at X, and is consistently below the curve W, due to the lag referred to above. In the case of the exhaust exchanger, the air temperature is indicated by curve B and lags about 20° below the useful available temperature of the exhaust exchanger. In the present system, all of the air is passed through the exhaust exchanger I (curve A), and then through the water exchanger 10 (curve W), as a result of which accumulative heating effect of curves B and X is obtained and, in addition, a very striking correlative effect is produced.

The correlative effect is the modulation of fluctuations in heat of the air passed into the body. The correlative effect, in turn, results in another equal advantage, namely; that the engine is maintained at more nearly its proper operating temperature at a time when it would normally be chilled much below the temperature required for efficient operation. The modulating effect results not merely from the accumulative heating effects of the two exchangers but from the order in which the air is passed in heating relation thereto.

It is noted that in the arrangement illustrated in Fig. 1, the water exchanger 10 may subtract heat from the air heated by the exhaust exchanger I, whereas the exhaust exchanger, if operating at a temperature below that of the water exchanger, cannot subtract heat from the water exchanger but pre-warms the air passing to the water exchanger under substantially all conditions.

Referring again to Fig. 2, it is noted that the useful heating of the water exchanger is most effective when the engine is idle or operating very slowly. As the vehicle moves forwardly, however, the volume of air passed through the outside radiator R increases very rapidly. This necessarily lowers the temperature of the water in the cooling system, the lowering being very gradual up to about 10 M. P. H. Above 10 M. P. H. the drop is very rapid until a speed of about 35 or 40 M. P. H. is reached and thereafter the drop is much less rapid.

The useful heat at the exhaust exchanger, however, is very slight up to 10 M. P. H., though increasing slightly from zero to about 10 M. P. H. After 10 M. P. H., it continues increasing at an accelerated rate until, at about 35 M. P. H., it approaches a constant, finally leveling off at about 45 M. P. H. at a temperature of around 200°. The heating of the air by either of these exchangers standing alone is, therefore, a curve of the same general shape as the useful heat curve of the particular exchanger but disposed bodily lower on the graph, as indicated by the curves X and B.

Here a striking effect should be noted. So long as the temperature of the air (curve B), from the exchanger 1 is less than that of the exchanger 10 (curve W), both will add heat to the air. Since progressively more heat is added to the air by the exhaust exchanger as the amount added by the water exchanger decreases, the result is the curve C which raises the temperature of the air passing the water exchanger slightly above the curve X at slow speed and a greater amount above the curve X as the curves W and B approach each other. In fact, heat will be added by the exhaust exchanger until the heating of the air thereby is equal, not to the heating of the air by the water exchanger, indicated by curve X, but to the temperature of the water exchanger itself, indicated by the curve W. In other words, the curve C will pass through the intersection of the curve W, the the actual useful heat of the water exchanger, and the curve B, the lagging air temperature curve of the exhaust exchanger. This phenomenon occurs at about half way between 25 and 30 miles per hour. Thereafter, to the right of such intersection, the water exchanger, being less in temperature than the lagging air temperature from the exhaust exchanger, indicated by the curve B, will begin absorbing and subtracting heat from the air.

At less than 25 M. P. H. it should be noted that the curve X has predominated and been augmented by the curve B as indicated by the curve C. However, after a speed of 25 M. P. H. is reached the curve B predominates. Between 25 and 30 M. P. H. it might be assumed that, since the curve B is above the curve X, the curve X would immediately cause a subtraction of heat from the curve B. This, however, does not occur because the water exchanger does not subtract from the curve B until such time as the curve W, and not the curve X, is below the curve B, because so long as the heat of the water in the heat exchanger 10 or W is equal to the temperature of the air coming from the exhaust exchanger 1, there will be no absorption of heat from curve B by the exchanger 10. Between these limits, the water exchanger may be of little benefit for heating.

To the right of the point of intersection of the curves B and W, there is a subtraction of heat from the air, curve B, by the water exchanger, curve W. At this point, however, the curve B is rising at a much more rapid rate than the curve W is falling. This subtraction, therefore, lowers the curve C from the curve B so that the resultant curve throughout the range is defined by the curve C. Analyzing curve C, it is apparent that a comparatively uniform temperature is maintained and even the most extreme fluctuations are only 18°, from about 165° maximum temperature to about 148° minimum temperature. The lower limit of temperature, however, exists only throughout the very limited range of speed of between 25 and 30 M. P. H., and this is a speed at which such vehicles seldom travel. In general, they operate at a much slower speed, often in second gear, during starting and stopping, and, when actually traveling, are traveling above 30 M. P. H. Thus the lowest temperature in the body exists for only very short intervals, followed and preceded by a temperature of about an average of 160° F. delivered to the distribution duct 16. This fluctuation is not enough to cause discomfort or to be noticed by the passengers. On the other hand, a fluctuation of 30 to 40° F. causes the passengers to feel, at the lower limit, that the air is actually cold, whereas it has merely dropped from 170 to 140°. Thus the lack of heat during continuous running and fluctuations which would result from the water exchanger alone are eliminated. The lack of heat from the exhaust exchanger while idling or traveling very slowly and fluctuations as the speed increases are also eliminated.

Furthermore, the mere summation of the heat from the two exchangers located at different positions in the body give undesirable results. It will be noticed the abrupt changes result in both curves B and X if the exchangers are at widely separated parts of the vehicle body. If widely separated, even though the average temperature in the body is that required, this temperature would not be uniform and passengers near first one exchanger and then near the other would have the feeling that they were subjected to hot and cold drafts. All of these disadvantages are overcome by the structure herein described.

Referring to the final advantage, it will be noted that to the right of the intersection of the curves B and W, the curve C drops below the curve B due to the absorption of heat by the heat exchanger 10 from the air at the temperature of the curve B. Necessarily, to effect this drop, there must be an equal increase in the temperature, not of the air issuing from the water exchanger and indicated by curve X, but in the temperature of the water exchanger itself, defined by the curve W. The difference between curves B and C, which represents the heat absorbed by the exchanger 10, is added to the curve W and the curve T results to the right of the point of intersection of curves B and W. To the left of this intersection, the curve T will be the same as curve W. The curve T, therefore, represents the temperature of the engine cooling media. Thus the exhaust heat from the products of combustion are added to the cooling media or water system of the engine to offset the rapid dissipation of heat and undue chilling of the engine due to severe outside weather conditions. Consequently, the engine can be maintained at a minimum temperature of about 150° under the most extreme conditions with the result of a considerable increase in efficiency and smoothness of operation.

Having thus described my invention, I claim:
1. In a motor vehicle having a closed body and a water cooled engine, an exhaust heat exchanger arranged to be heated by exhaust products from the engine, a water heat exchanger connected in the water cooling system of the engine, means to force a stream of air into the body through the exhaust heat exchanger and the water heat exchanger progressively, and means to induce air into said stream at a point between the exhaust heat exchanger and the water heat exchanger, whereby the capacity of the water heat exchanger is not limited by the air capacity of the exhaust heat exchanger.

2. In a motor vehicle having a closed body and a water cooled engine, an exhaust heat exchanger arranged to be heated by the exhaust products from the engine, a water heat exchanger connected in the water cooling system of the engine, a conduit means leading from the exhaust exchanger to the water exchanger, means to force air into the exhaust exchanger and through said conduit, a blower connected in said conduit for receiving the air from the exhaust exchanger and forcing the same through the water exchanger through said conduit, and means at the discharge side of said blower for admitting induced air to the water exchanger.

3. In a motor vehicle having a closed body and a water cooled engine, an exhaust heat exchanger arranged to be heated by the exhaust products from the engine, a water heat exchanger connected in the water cooling system of the engine, a conduit means extending between the exhaust heat exchanger and the water heat exchanger and connecting said heat exchangers in series, means to force air through said conduit into a heat exchange relation with said heat exchangers, a blower connected in said conduit for forcing air through the water heat exchanger and through the conduit, and means at the discharge side of the blower for admitting induced air to the water exchanger.

JOHN C. DEITZ.